: 2,897,192

PROCESS FOR THE TREATMENT OF THE GENUS AMARYLLIDACEA, LILIACEA AND RELATED SPECIES

Gustav J. Nord, Asheville, N.C.

No Drawing. Application April 8, 1957
Serial No. 651,171

7 Claims. (Cl. 260—210.5)

My invention relates to a process for treating plants, and especially the leaves of the genus Amaryllidacea, Liliacea and related species having leaves or stems containing substances of a saponaceous or glycosidal steroidal nature found in those tropical American plants. Such steroidal substances are characterized as perhydro-1,2-cyclopentenophenanthrene derivatives and find extensive use in the medical, botanical and other technological fields.

I am aware of the work of many scientists in isolating the various saponins from these plants, especially the work of chemists in the synthesis of sex hormones, cortisone, etc. from the steroids found in these plants. However, little or no information has been set forth in the patent art or literature which teaches the recovery and isolation of the natural occurring steroids, the precursors of sex hormones, cortisone, etc. from the plants themselves. This invention is primarily concerned with a method of recovering the saponins which has practical importance and may be used on a commercial scale.

The varieties of those plants more generally adapted for use in this process are the *Agave lechuguilla*, various species of the Yucca family, aloes, maguey, sisal and other similar plants having fleshy and succulent leaves of which more than 300 varieties have been described. Such plants have been the subject of attention from the time of Cortez to the present day because of the many valuable uses of the products which may be obtained from them.

One of the principal fields where some of the products have found application is the medicinal field. Preparations from the Agave plants have been used to treat paralysis due to nerve damage, inflammation, and a number of other ailments. The principal use of juice extracts from these plants today is to provide valuable chemicals from which sex hormones, cortisone, etc. may be synthesized in several steps and thereby simplify and cheapen their production.

It is, therefore, a primary object of this invention to teach a process for the recovery of the juice of the above-listed plants which is commercially practical.

It is another object of this invention to provide a relatively quick method for recovering juice extracts from these plants, which method will prevent degradations of the chemical substances found therein.

It is a further object of this invention to provide a process for the recovery of a high yield of those plant juices in a relatively pure state.

It is another object of this invention to provide a process which enables those juices to be extracted in such a manner that they are initially filtered by the pulp and fiber found in the leaves.

It is still a further object of this invention to provide a process wherein the recovery of those plant juices does not seriously impair the extraction of other valuable materials found in the plants, including the fibers, etc.

Before proceeding to a description of the invention, it is important to note that most plants of the genus Amaryllidacea, and especially the Agave species, have leaves which are protected by a strongly suberized epidermis which is very resistant even to the action of relatively strong acids. This protective epidermis is formed in part by a heavy exterior waxy coating.

In histochemical experiments, it has been found that steroidal saponins are present in many of the Agave plants and are particularly abundant in the pulp and tissues forming the leaf. The juice expressed from a fresh green leaf contains an appreciable amount of colloidal impurities, gums, wax, hydrolytic enzymes, soluble polyphenols, albuminous and coloring matter, i.e. chlorophyll. These materials must be removed from the juice before the steroids can be successfully isolated.

Most attempts to overcome the above difficulties have manifested themselves in grinding and comminuting the well-protected leaf and extracting the steroids by conventional hot alcohol or other solvents. Necessarily this method destroys the valuable fiber content of the leaf and results in the extraction of large proportions of the tar-forming organic matter together with coloring materials with the steroids, a good many of which remain in the extract even after purification. Their complete removal involves a number of complicated purification steps to obtain the steroids which is suitable only for production on a laboratory scale. The alcohol or solvent extraction alone is costly, not to mention the loss of valuable fibers and the low yield of steroids because of the numerous manipulative steps which result in a considerable portion of the steroids remaining with the substances removed.

The present invention contemplates a process which employs a radiant energy treatment that overcomes the above difficulties and further enables moderate pressure to yield, without solvents, a relatively concentrated extract, purified and sterilized, which consists of a substantial precentage of saponin associated with diverse sugars originally present in the leaf.

This radiant heating inhibits the action of enzymes and thereby prevents the undesirable enzymatic hydrolysis of the saponins before the protective covering of the leaf has been broken, since I have found that immediately after the leaf has been ruptured, spore-bearing organisms and enzymes act to deleteriously affect the final yield of saponins.

This radiant energy treatment also acts to coagulate albuminoids, break up gums and to coagulate the chloroplasts and pigments so that much of these undesirable substances are filtered out in the pressing operation.

Under normal conditions, the radiant-heat-treated leaf parts with more than one-half of its weight in juice when subjected to pressure or mechanical impingement, leaving a residue of pulp and fiber. The pulp and fiber residue acts as a filtering medium retaining the impurities that were soluble in an untreated leaf, but rendered insoluble by the action of radiant heat.

In carrying out my invention, I prefer to process leaves which are freshly cut from the roots of the plant and to wash the roots and leaves separately in an aqueous solution containing a small amount of bactericidal detergent, or ultraviolet irradiated water may be used, to aid in the removal of adhering debris and to protect the leaves against surface contamination while in transit or preliminary storage awaiting processing. The leaves are treated separately from the roots since extraction of the valuable fibers of the leaves may be an integral step in the process.

After draining off the surplus water, the leaves are placed on a suitable open-mesh conveyor belt and spread out to form a substantially even sheet of leaves which is conveyed under a tunnel of infrared lamps or radiant tubular metal heaters. If infrared lamps of the 375–500 watt type are used, they should be mounted at least 8 to 10 inches from the surface of the leaves so that the infrared rays can be readily absorbed and thereby transformed into useable heat which is then transferred throughout the leaves by conduction.

The lamp assembly may be arranged to direct the heat on the leaf material from above, from the side, or from several directions with the material passing through the radiant tunnel. The lamps or tubes should be spaced so that there will be no overlapping circles of heat which would cause hot or cold spots and produce uneven heating of the leaf material. Inasmuch as heating of the air is not involved in the transfer of energy by radiation, insulated enclosures are not required. However, it is advisable to protect the leaf material from excessive draft.

It is important to use infrared lamps or other suitable types of radiant heating so that the ambient temperature of the leaves should not exceed 120° C. because decomposition of heat sensitive components above that temperature begin to manifest themselves. It is further important that the leaves not be subjected to high temperatures for too long a time which would tend to dry them.

The amount of heat applied to the leaves may be varied by changing the speed of the conveyor, or by switch control of the lamps or tubes across the width of the leaf material; or the same results may be accomplished by multi-tap transformers for operating the lamps at different voltages.

The speed of the conveyor and the retention period of the leaves in the heating zone depends on a number of factors such as the thickness, moisture content and surface condition of the leaves. Under normal circumstances it has been found that a linear belt speed of 3–15 feet per minute will permit the desired softening of the leaf constituents.

The conveyor may be provided with variable speed transmission and means to turn over the leaves after a predetermined travel so that all the surfaces are uniformly heated; and the belt and infrared lamps or tubes may be proportionally increased in length, width, or both. I have found that there are no practical limits imposed upon the dimensions by electrical considerations, and the conveyor and tunnel design and its source of radiant heat energy may vary within wide limits, and the heat treatment may be executed batchwise if desired.

I have found that radiant heat increases the permeability of the plant tissues when subjected to subsequent roller pressure. In this connection, it is significant to note that the Agave leaf, for example, is protected by a heavily cutinized epidermis which has minute perforations, botanically known as the stomata. The stomata, similar to pores, permits the plant to breathe. Under radiant heat treatment, the stomata perforations become closed, permitting the escape of little or no moisture from the leaf. When the internal temperature of the leaf reaches 85° C. or more, vapors and gases generated by the radiant heat create sufficient pressure to rupture the cells, causing the steroids to be diffused and further changing the surface tension facilitating the subsequent separation of the solids from the liquid without the leaching of valuable water-soluble components which I have found to be the case when treating the leaves with steam under pressure (as disclosed in my Patent No. 2,121,210), flowing steam or boiling water. After this treatment the leaves remain in a bloated condition.

After the heat treatment, the leaves are subjected to a moderate pressure to express the juice while the leaves are still in a heated condition. Most any type of juice expressing apparatus may be employed, such as a roller press, hydraulic press, continuous screw press, etc. I prefer to use a roller press in order to preserve the qualities of the fibers which constitute a valuable by-product, and have found that the retained pulp and fiber form a filter medium initially clarifying the extract. However, a continuous screw press as referred to in my Patent No. 2,210,463 may be used.

If roller presses are used, a pressure of 80–200 lbs. per sq. inch is sufficient to extract the juice and such pressure insures that a minimum amount of pulp will be separated from the fibers and the amount of impurities will be separated with the juice.

The juice from this pressing operation is of a light amber color in contrast with the green colored juice as extracted from unheated leaves. This effect probably is caused by the coagulation of the chloroplasts and the removal thereof by the filtering effect of the remaining pulp and fiber.

Between 40–50 percent by weight of the leaf of the *Agave lecheguilla* remains as compressed pulp and fiber when processed by roller pressure as disclosed above. The fibers, which constitute 15 percent by weight of the leaf, may then be separated from the pulp easily by the method disclosed in my Patent No. 2,827,454 granted March 18, 1958. This percentage of remaining pulp is considerably less than the approximately 85 percent by weight which must be removed in the case of unheated leaves.

The fibers, after the pulp has been mechanically brushed away, may then be washed and further processed as taught in my Patent No. 2,121,210.

The extracted clear juice retains a minimum of tar-forming substances and contains an average of 25 percent total solids consisting of saponin and carbohydrates which, upon hydrolysis, yields smilagenin, a precursor used in the synthesis of sex hormones, cortisone, etc. The juice, as extracted, has also found use as an additive to mud to produce a hardened surface and soil binder as well as an asphalt emulsion stabilizer.

Other uses, include the preparation of mildew-preventing and forming solutions in the application of wax emulsions to citrus fruits. The juice may also be dehydrated or dried without refinement to form a granular or powdered concentrate.

This invention involves only three major steps, (1) washing the leaves, (2) treating the leaves with radiant heat, and (3) expressing the juice. The first step is preferred but not mandatory. The third step, if carried out by means of a roller press, will enable the majority of the fibers to be undamaged and readily separable from the pulp.

Because radiant energy heats the interior of the leaf instantaneously, no prolonged heating, which might adversely affect the yield of extract, is necessary. Extraction of the juice may be quickly accomplished.

While preferred embodiments of the invention have been described, it will be understood that they have been given to assist those skilled in the art to practice my invention, and I do not intend to limit my invention except as indicated in the claims.

I claim:

1. Process for the extraction of glycosides from steroidal saponin-bearing plant materials of a genus of the group consisting of Amaryllidacea and Liliacea, which comprises subjecting the plant leaf to the action of artificial radiant energy raising the internal temperature of the leaf to about 85° C., and separating the juice from the leaf by mechanical pressure.

2. Process for the extraction of glycosides from steroidal saponin-bearing leaf materials of a genus of the group consisting of Amaryllidacea and Liliacea, which comprises subjecting the leaf material to the action of artificial radiant energy wherein said radiant energy is infrared heat, raising the ambient temperature of the material up to a temperature of not more than 120° C., subjecting the materials while still heated to the action of mechanical pressure and collecting the expressed juice.

3. Process for the extraction of glycosides from steroidal saponin-bearing plant materials of a genus of the group consisting of Amaryllidacea and Liliacea which comprises cutting the leaf of the plant to separate the base therefrom, subjecting the leaf to the action of artificial radiant energy wherein said radiant energy is infrared heat, raising the ambient temperature of the leaf up to a temperature of approximately 120° C., subjecting the still heated leaf to mechanical pressure and collecting the expressed juice.

4. Process for the extraction of glycosides from steroidal saponin-bearing plant materials of a genus of the group consisting of Amaryllidacea and Liliacea which comprises cutting the leaf of the plant to separate the base therefrom, washing the leaf in an anti-bactericidal solution, subjecting the leaf to the action of artificial radiant energy wherein said radiant energy is infrared heat, raising the ambient temperature to about 120° C., subjecting the still heated leaf to mechanical pressure, maintaining a pressure of 80–200 pounds per square inch, and collecting the expressed juice.

5. Process for the extraction of glycosides from steroidal saponin-bearing plant materials of a genus of the group consisting of Amaryllidacea and Liliacea which comprises cutting the leaf of the plant to separate the base therefrom, washing the leaf in an anti-bactericidal solution, subjecting the leaf to the action of artificial radiant energy wherein said radiant energy is infrared heat, raising the ambient temperature of the leaf up to a temperature of approximately 120° C., subjecting the still heated leaf to mechanical pressure, collecting the expressed juice, and mechanically brushing the pulp from the fibrous residue before washing the fibers.

6. A process in accordance with claim 1 where the source of radiant energy is infrared heat.

7. Process for the extraction of glycosides from steroidal saponin-bearing leaf materials of a genus of the group consisting of Amaryllidacea and Liliacea, which comprises subjecting the leaf material to the action of artificial radiant energy wherein said radiant energy is infrared heat, raising the ambient temperature of the material up to approximately 120° C., maintaining the radiant energy until the internal temperature of said material is approximately 85° C., and thereafter separating the juice from the material by mechanical pressure.

References Cited in the file of this patent

UNITED STATES PATENTS

| | | |
|---|---|---|
| 2,301,787 | Nord | Nov. 10, 1942 |
| 2,774,713 | Gould et al. | Dec. 18, 1956 |
| 2,785,107 | Krider | Mar. 12, 1957 |